Nov. 26, 1963  S. LEVITT ET AL  3,112,040

FREIGHT HANDLING SYSTEM

Original Filed Jan. 10, 1961  5 Sheets-Sheet 1

INVENTORS
Semond Levitt
Eugene Hindin
Andrew Abolins

BY Curtis, Morris, & Safford

ATTORNEYS

Nov. 26, 1963  S. LEVITT ETAL  3,112,040
FREIGHT HANDLING SYSTEM
Original Filed Jan. 10, 1961  5 Sheets-Sheet 2

INVENTORS
Semond Levitt
Eugene Hindin
Andrew Abolins
BY Curtis, Morris, & Safford
ATTORNEYS

Nov. 26, 1963    S. LEVITT ETAL    3,112,040
FREIGHT HANDLING SYSTEM
Original Filed Jan. 10, 1961    5 Sheets-Sheet 4

INVENTORS
Semond Levitt
Eugene Hindin
Andrew Abolins
BY Curtis, Morris, & Safford
ATTORNEYS Nov. 26, 1963  S. LEVITT ET AL  3,112,040
FREIGHT HANDLING SYSTEM
Original Filed Jan. 10, 1961  5 Sheets—Sheet 5

INVENTORS
Semond Levitt
Eugene Hindin
Andrew Abolins
BY
Curtis, Morris, & Safford
ATTORNEYS United States Patent Office 3,112,040
Patented Nov. 26, 1963

3,112,040
FREIGHT HANDLING SYSTEM
Semond Levitt, Huntingdon Valley, Eugene Hindin, Philadelphia, and Andrew Abolins, Penndel, Pa., assignors to Flexi-Van, Inc., New York, N.Y., a corporation of Delaware
Continuation of application Ser. No. 81,745, Jan. 10, 1961. This application Mar. 19, 1963, Ser. No. 275,782
21 Claims. (Cl. 214—38)

This application is a continuation of our pending application Serial No. 81,745, filed January 10, 1961, now abandoned.

This invention relates to a system for transferring freight in bulk between a highway tractor and wheel assembly and a railroad flat car or other carrier or stationary means of support.

In U.S. Patents No. 2,933,052 and 2,933,053, there is disclosed a freight handling system including a railroad car having at a central portion of its upper surface a turntable which is mounted for rotation about a vertical axis and which includes a pair of spaced, parallel, horizontal skids; a highway wheel assembly or "bogey" having at its upper surface a similar pair of skids; a trailer body having at its under surface a pair of spaced, parallel rails adapted for longitudinally slidable, laterally interlocking engagement with the skids on said turntable and on said bogey; and a highway tractor having a fifth wheel adapted for engagement with a kingpin depending from the forward end of the trailer body.

With the turntable rotated to orient the skids thereon transversely of the railroad car and with the bogey positioned alongside the railroad car, with its skids in alignment with those of the turntable, the trailer body may be pushed or pulled from the turntable to the bogey or vice versa by means of the tractor. Locking means are provided on the trailer body and on each of the pairs of skids for locking the trailer body in proper highway transit position on the bogey or in a centered position on the turntable. With the trailer body in this centered position on the turntable, the turntable may be rotated to align the trailer body longitudinally of the railroad car for rail transit, or transversely of the railroad car for transfer to or from the bogey. When the trailer body is aligned with the railroad car, the kingpin is engaged by a latch which locks the trailer body in that position for rail tarnsit.

In the aforesaid Patent No. 2,933,053, there is disclosed an improved railroad car for such a system, in which the turntable is movable vertically by means of a hydraulic cylinder. This not only permits the height of the turntable to be adjusted to compensate for differences in the level of the surface adjacent the railroad track, but also permits the trailer body to be raised to disengage the rails thereon from the skids on the highway bogey and to disengage the kingpin on the trailer body from a locking recess on the railroad car.

That system has proved in actual use to be a highly efficient method of transferring freight in bulk from one form of carrier to another, particularly since the trailer body could be transferred to or from either side of a flat car in the middle of a train, without any extraneous equipment, such as cranes, lift trucks, ramps or the like at the point of transfer, and no manpower other than the truck driver himself. The transfer from the highway bogey to the rail car or other form of transportation or stationary means of support, or the transfer from such other means to the highway bogey, could be accomplished quickly—within an elapsed time of approximately four minutes.

However, in actual use, certain limitations of that system have become apparent. For example, if the trailer body is unevenly loaded, the turntable tends to bind, making it difficult for one person to push the trailer body and the turntable around. Also, since the weight of the trailer body is imposed in the central portion of the railway car, at a substantial distance from the wheel trucks, it is necessary to use heavy girders in the construction of the railroad car. This, of course, increased the cost of the railroad car as did the provision of the hydraulic cylinder for raising and lowering the turntable. Furthermore, since the trailer body was centered on the turntable, it projected beyond both sides of the railway car when the turntable was turned to orient it transversely of the railway car, thus requiring clearance at both sides of the railroad track.

The present invention overcomes all of the aforementioned disadvantages and limitations of the previous system by providing support for each end of the trailer body at all times, both during transit by highway, rail or other carrier, and during transfer from the railroad car to the highway wheel assembly and vice versa, thereby making it immaterial whether or not the load in the trailer body is balanced. The system is such that the transfer of a trailer body to or from the railway car may be made even though one side of the railroad track is obstructed to prevent projection of the trailer body substantially beyond the railroad car at that side. The cost of manufacture of the railroad car is substantially reduced by reducing the load which is imposed upon the intermediate portion of the car, and by eliminating the hydraulic ram for raising and lowering the turntable. This, of course, also considerably reduces the weight of the railroad car and makes it possible for a railroad locomotive of given power to pull a train of a greater number of cars. The present invention achieves all of the aforementioned objectives in a system in which a single road vehicle with only its driver accomplishes transfer of the trailer body to and from the railroad car quickly and easily. Other and further advantages and objectives of the invention will be apparent from the ensuing description.

Figure 1:
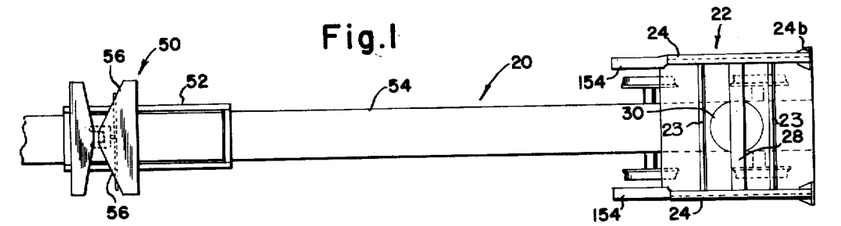
FIGURE 1 is a fragmentary top plan view of a railroad car forming one element of a freight handling system embodying features of this invention.
Figure 2:
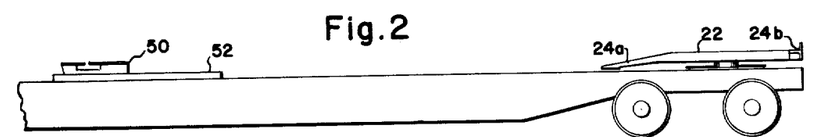
FIGURE 2 is a fragmentary side elevational view of the railroad car shown in FIGURE 1.
Figure 3:
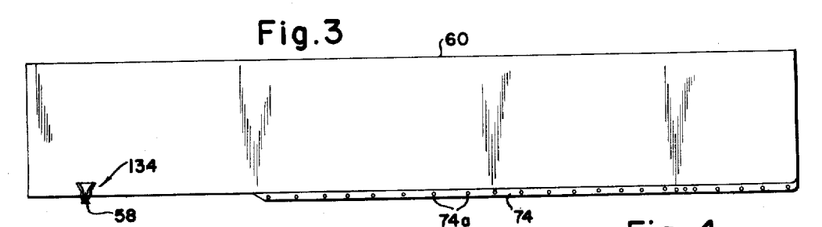
FIGURE 3 is a side elevational view of a trailer body forming another element of said freight handling system.
Figures 4, 5, 6, 7, 8, 9:
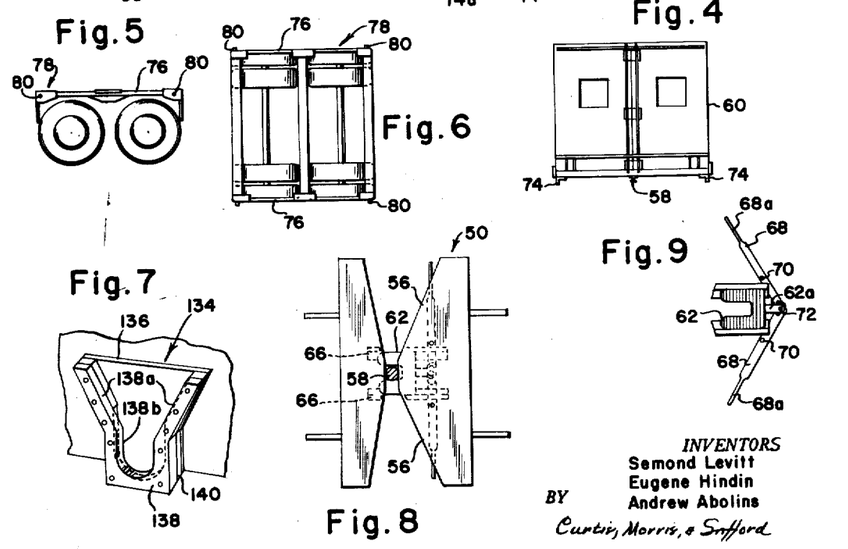
FIGURE 4 is an end elevational view of the trailer body shown in FIGURE 3.
FIGURE 5 is a side elevational view of a highway wheel assembly or "bogey" also forming an element of said system.
FIGURE 6 is a top plan view of the bogey shown in FIGURE 5.
FIGURE 7 is an enlarged, fragmentary isometric view of the ram-engaging socket which is provided at each side of the trailer body shown in FIGURES 3 and 4.
FIGURE 8 is an enlarged fragmentary top plan view of the railroad car shown in FIGURES 1 and 2 showing the support and the kingpin receiving slot therein.
FIGURE 9 is a fragmentary sectional view of the portion of the railroad car shown in FIGURE 8, showing the kingpin latching mechanism moved to unlatching position.
Figure 12:
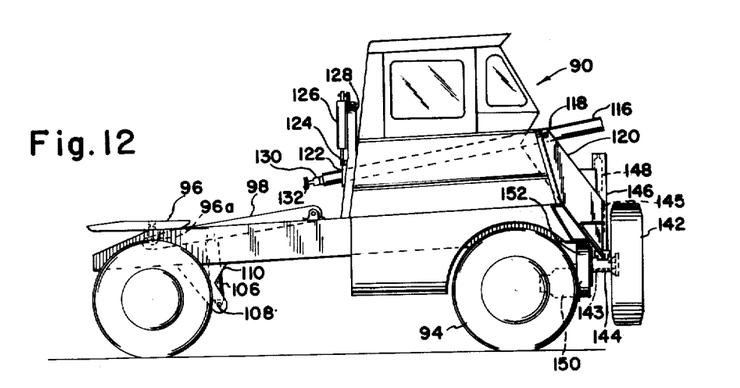
FIGURE 12 is a side elevational view of a yard tractor forming another element of the system.
Figure 13:
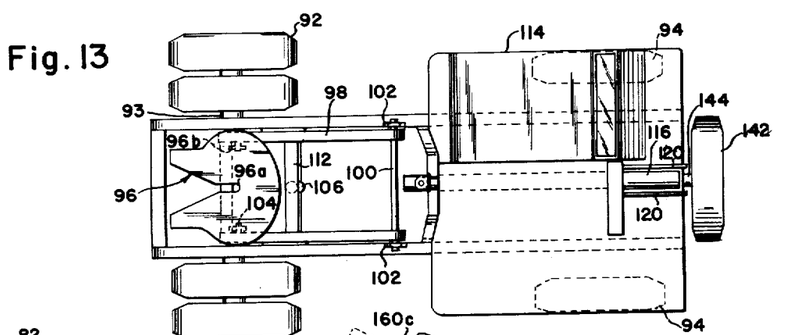
FIGURE 13 is a top plan view of the yard tractor shown in FIGURE 12.

In general terms, the freight handling system of the present invention includes four components: a railroad flat car or other carrier or stationary support, as illustrated in FIGURES 1 and 2; a trailer body as illustrated in FIGURES 3 and 4; a highway wheel assembly or bogey as illustrated in FIGURES 5 and 6; and a tractor, for example a yard tractor as illustrated in FIGURES 12 and 13.

The railroad car may include elements for supporting any desired number of trailer bodies. The particular railroad car 20 shown in FIGURES 1 and 2 is adapted to handle two trailer bodies; however, only one-half of the car is shown in these figures, with means for supporting only one trailer body.

Figures 10, 10B:
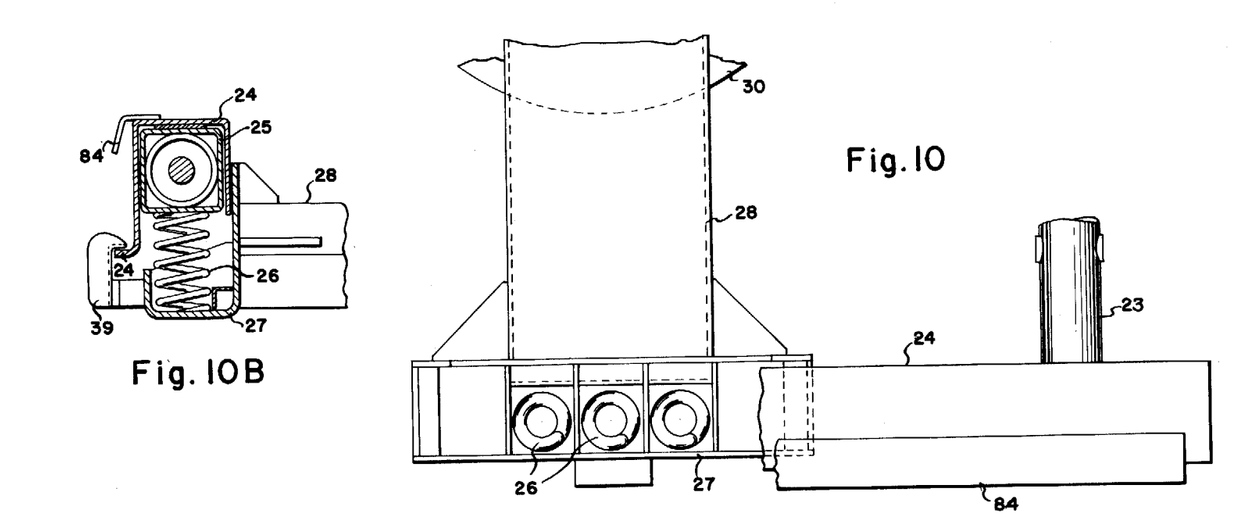
FIGURE 10 is an enlarged, fragmentary top plan view of the turntable of the railroad car, which is shown partly broken away to reveal its inner construction.
FIGURE 10B is a fragmentary transverse sectional view taken on the line 10B—10B of FIGURE 10A.

As may be seen, the railroad car 20 is provided at one end with a turntable generally designated 22 which is provided at its upper surface with a pair of spaced, parallel skids 24 which are spaced apart by a pair of transversely extending pipes 23. As may be seen in FIGURE 10B, each of the skids 24 is supported for longitudinal sliding movement on a square tube 25 which in turn is resiliently supported by springs 26 on a channel 27. The skids 24 and the tube 25 are restrained from vertical movement off of the channel 27 by a hook 39 which is secured to the channel 27 and which engages a flange 24c on the skid 24. The two channels 27 are connected at opposite ends of a rectangular cross member 28.

Figures 11, 11A:
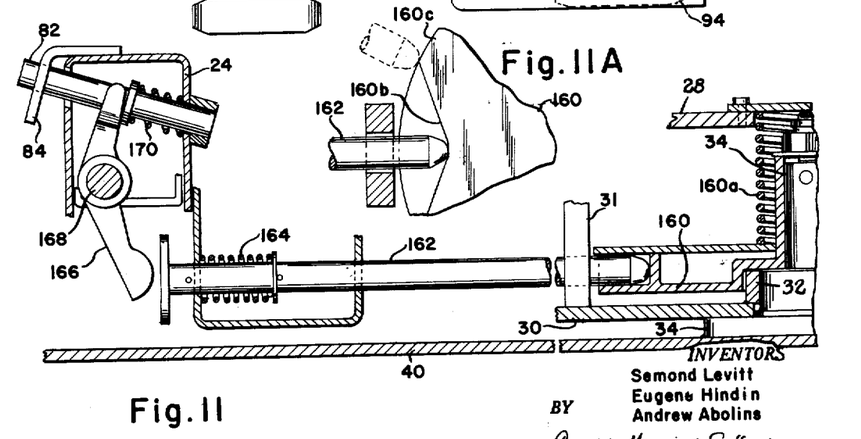
FIGURE 11 is an enlarged fragmentary transverse sectional view taken generally along the line 11—11 of FIGURE 1.
FIGURE 11A is a fragmentary sectional view taken on the line 11A—11A of FIGURE 11.

As may be seen in FIGURE 11, the channel 28 is supported at its center on a circular plate 30 from which it is spaced by blocks 31. The plate 30 has at its center a circular opening around which is secured a short cylindrical flange 32, the plate 30 and flange 32 rotatably engaging a central post 34 of stepped diameter which serves as a combination radial and thrust bearing for the turntable.

The skids 24 are resiliently held in a predetermined longitudinal position on the tubes 25 (FIGURE 10B) by means of stacked discs of rubber 36 contained within the tubes 25 and engaged by the heads 38a of plungers 38 whose outer ends engage brackets 40 secured to and extending transversely of the interior of the skids 24. This arrangement permits resilient longitudinal movement of the skids 24 and the trailer body thereon, while the springs 26 permit resilient vertical movement, thus providing a cushioned support for the trailer body and limiting the shocks to which it is subjected in transit.

As may be seen in FIGURES 1 and 2, also mounted at the upper surface of the railroad car 20 is a support generally designated 50 which is mounted on a frame 52 which slidably engages the central, longitudinally extending girder or sill 54 of the railroad car to permit adjustment of the longitudinal position of the support 50 relative to the turntable 22 according to the length of the trailer body to be accommodated. The support 50 is provided at either side with an outwardly flaring kingpin receiving slot 56 which is adapted to receive the kingpin 58 (FIGURES 3 and 4) which projects dowwnardly from the forward end of the trailer body 60.

As best shown in FIGURES 8 and 9, the support 50 is provided with a C-shaped kingpin engaging latch 62 which is supported at the under surface of the support 50 by means of guide brackets 64 and 66 for horizontal sliding movement between a locking position, in which it is shown in FIGURE 8, at which the two legs of the latch straddle the kingpin 58 and retain it in the narrow central portion of the slot 56, and an unlocking position, shown in FIGURE 9, at which the legs of the latch 62 are clear of the slot 56 to permit the kingpin to be moved out of the slot in either direction. The latch 62 is moved by means of a pair of levers 68 which are pivotally mounted on the under side of the support 50 on studs 70, with the inner ends of the two levers being pivotally attached to an extension 62a on the latch 62 by means of a pin 72 which is slidably received in slots in the levers 68. As may be seen in FIGURE 8, the outer ends of the two levers 68 are formed into handles 68a which are in convenient position to be grasped by a person positioned at either side o fthe railroad car. Conventional detent means (not shown) are provided to hold the levers 68 and the latch 62 in either one of their two positions to which they have been manually moved.

As may be seen in FIGURES 3 and 4, the trailer body 60 is also provided at the rear portion of its under surface with a pair of parallel, longitudinally extending rails 74 which are spaced apart for longitudinally slidable, laterally interlocking engagement with the skids 24 on the turntable 22 of the railroad car.

As may be seen in FIGURES 5 and 6, the highway wheel assembly or bogey is of the tandem axle, 8-wheel type, with an upper frame having at either side parallel, longitudinally extending skid members 76 which are also spaced apart for longitudinally slidable, laterally interlocking engagement with the rails 74 on the trailer body 60. As may be seen in FIGURE 3, the rails 74 are provided with a series of holes 74a which engage movable locking pins 80 which project through the sides of the skids 76 on the bogey 78 as well as movable locking pins 82 (FIGURE 11) which project through the slide flanges 84 on the skids 24 of the turntable 22 on the railroad car 20.

As shown in FIGURES 12 and 13, the yard tractor 90 is provided with a chassis of the semi-trailer type having four rear wheels 92 on a single rear axle 93 and two steerable front wheels 94. At the upper surface of the rear portion of the tractor 90, it is provided with a fifth wheel 96 having a rearwardly opening slot 96a for receiving the kingpin 58 on the trailer body 60 and having conventional latching means (not shown) for locking it at the inner end of the slot 96a directly above the rear axle 93. The fifth wheel 96 is pivotally mounted at the rear end of a frame 98 by means of trunnions projecting inwardly from the frame 98 and journalled in bosses 96b projecting downwardly from the fifth wheel 96. The forward end of the frame 98 is pivotally mounted by means of a transverse rod 100 which projects beyond the sides of the frame to form trunnions which are journalled in pillow blocks 102 on the frame of the tractor. The frame 98 and the fifth wheel 96 are driven vertically by a hydraulic cylinder 106, the lower end of which is pivotally secured to a transverse rod 108 supported by brackets 110 depending from the frame of the tractor. The piston rod 106a of the cylinder 106 is pivotally attached to a cross-bar 112 on the frame 98. Thus, the hydraulic cylinder serves to swing the frame 98 in an arc about its forward end and thereby raise and lower the fifth wheel 96.

Extending along the central axis of the tractor 90 at the right-hand side of the driver's cab 114 is another hydraulic cylinder 116, which is loosely supported for pivotal movement in a vertical plane with a slight horizontal play, on pins 118 (FIGURE 12) at the upper ends of a pair of arms 120 projecting upwardly from the frame of the tractor near its forward end.

The rear end of the cylinder 116 is supported in a sling 122 depending from the piston rod 124 of a hydraulic cylinder 126, the upper end of which is pivotally mounted at the upper apex of a frame 128 which is of the general shape of an inverted V and which projects upwardly from the frame of the tractor just rearwardly of the cab 114. Thus, the cylinder 126 serves to raise and lower the rearward end of the cylinder 116 and the piston rod 130 thereof.

The outer end of the piston rod 130 of the cylinder 116 is provided with an enlarged head 132 which is adapted for engagement with sockets 134 which are provided at either side of the trailer body 60 near its forward end. As best shown in FIGURE 7, each of the sockets 134 consists of a backing plate 136, a key plate 138, and a spacer plate 140 sandwiched between them. The key plate 138 is provided at its upper end with upwardly flaring opening 138a which narrows down to an upwardly opening slot 138b which is just wide enough to receive the piston rod 130 of hte hydraulic cylinder 116 (FIGURE 12), while preventing withdrawal of the enlarged head 132. Thus, the head 132 may be interengaged with the socket 134 by using the cylinder 126 (FIGURE 12) to lower the piston rod 130 into the slot 138b, and disengaged by raising it. With the piston rod 130 thus engaged, the hydraulic cylinder 116 (FIGURE 12) may be used for pushing and pulling the trailer body to transfer its forward end from the fifth wheel 96 of the tractor 90 to the support 50 of the railway car, and vice versa.

At the front end of the tractor 90 there is a pivoting wheel 142 which is supported on a short axle 143 journalled in a sleeve 144 which is secured at the lower end of a vertical post 145 of square cross-section which is slidably received in a vertical sleeve 146 of similar cross-section and is vertically movable by means of a hydraulic cylinder 148 fixed within the upper end of the sleeve 146 with its piston rod connected to the upper end of the post 145. The pivoting wheel 142 is driven by means of a hydraulic motor 150 through a gear box 152, the motor 150 and gear box 152 being fixedly mounted at the inner end of the sleeve 144 for vertical movement therewith.

In normal use of the tractor 90, the pivoting wheel 142 is carried at its upper position in which it is shown in FIGURE 12, at which it is out of contact with the ground. However, the wheel 142 may be lowered into engagement with the ground by means of the hydraulic cylinder 148 to lift the front wheels 94 of the tractor off the ground. Then the wheel 142 may be driven by the motor 150, to pivot the tractor about a vertical axis extending through its rear axle and through a kingpin at the inner end of the slot 96a in the fifth wheel 96.

With reference to FIGURES 14–19, the sequence of operations for transferring the trailer body 60 from the highway bogey 78 to the railroad car 20, and vice versa, will now be described.

Figures 14, 15, 16:
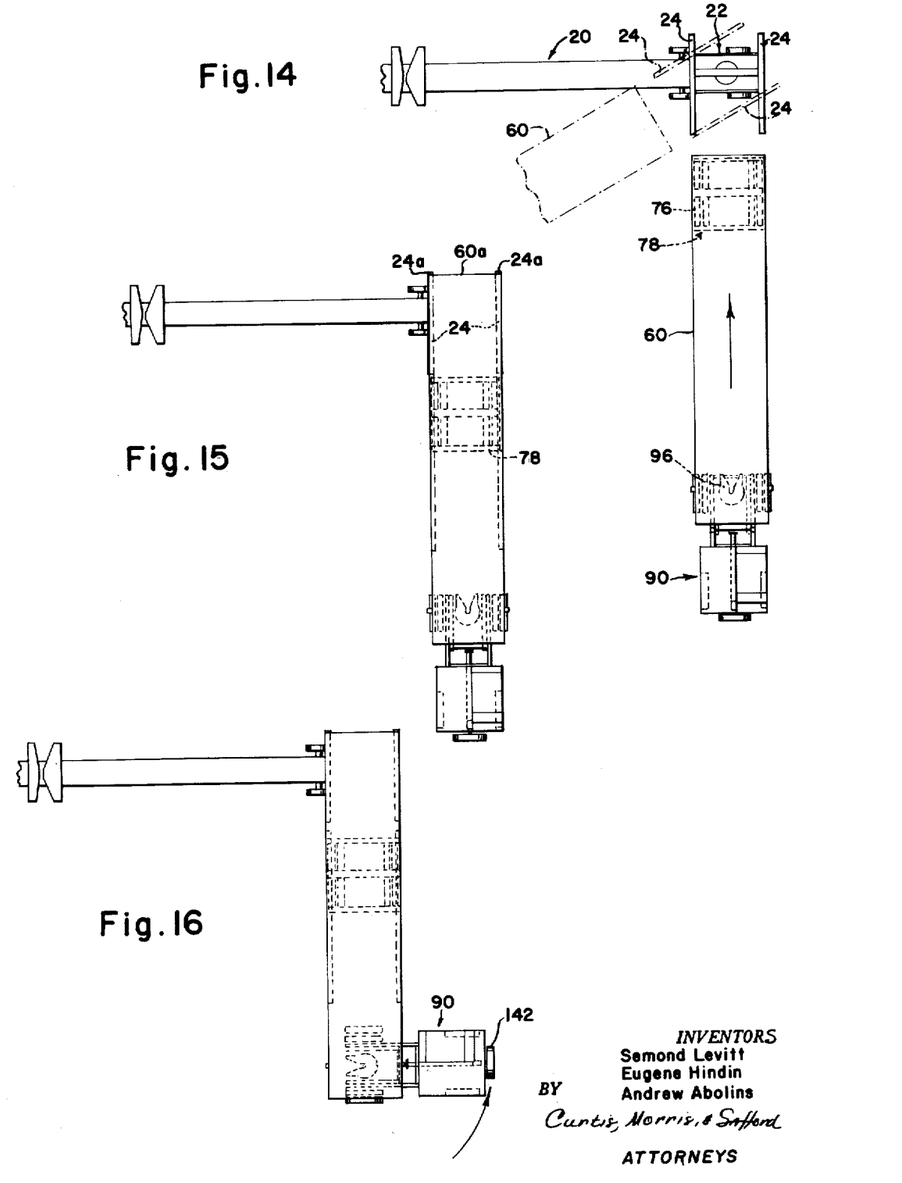
FIGURES 14-19 are diagrammatic top plan views of the system illustrating the successive steps in the process of transferring the trailer body from the highway bogey to the railroad car.

In FIGURE 14, the trailer body 60 is shown with the bogey 78 secured at its rear end and with its forward end supported on the fifth wheel 96 of the tractor 90 in normal semi-trailer fashion for highway transit. To transfer the trailer body 60 to the railroad car 20, the turntable 22 of the railroad car is turned to orient the skids 24 generally transversely of the car. It is an advantage of the present invention that the transfer may be made not only with the turntable oriented to place the skids 24 at an angle of 90° relative to the axis of the car, as shown in full lines in FIGURE 14, but also at lesser angles down to approximately 30°, as indicated in broken lines. This reduces the lateral clearance which is required at one side of the railroad car to effect the transfer.

As the turntable is rotated to a transverse position, the locking pins 82 (FIGURE 11) are automatically retracted by a cam 160 (FIGURES 11 and 11A) which is supported in fixed position by a skirt 160a secured to the upper end of the hub 34. The cam 160 has a pair of depressions 160b (only one of which appears in FIGURE 11A), each of these depressions being aligned with a plunger 162 which is mounted on the turntable for longitudinal movement when the turntable is oriented so that the skids are parallel to the long axis of the railroad car. When the turntable is rotated through an angle of approximately 25° in either direction from such aligned position, the plunger 162 rides out of the depression 160b of the cam 160, as shown in broken lines in FIGURE 11A, and onto the raised dwell 160c of the cam. This pushes the plunger 162 to the left, as viewed in FIGURE 11, against the resistance of a spring 164, causing its outer end to rock a lever 166 in a clockwise direction about its pivot 168, and retract the locking pin 82 against the resistance of a spring 170, so that the outer end of the locking pin is below the outer surface of the slide flange 84 to permit the trailer body 60 to be slid onto or off of the turntable 22.

The tractor 90 is used to back the trailer body 60 toward the railroad car 20, as indicated by the arrow in FIGURE 14. When the trailer body 60 is backed up to the point where the rear end 60a of the trailer is adjacent the outer ends of the skids 24 on the turntable 22, the air hose to the bogey 78 is disconnected, locking the brakes on the bogey, and the locking pins 80 (FIGURE 5) are retracted, freeing the bogey for longitudinal movement along the rails 74 of the trailer body. Then backing of the trailer body 60 by the tractor 90 is resumed to slide the trailer body onto the skids 24 on the turntable 22 of the railroad car 20. As the trailer body 60 engages the skids 24, it rides up inclined ramp portions 24a (FIGURES 2 and 10) at the outer ends of the skids 24 and onto the upper horizontal portions of the skids.

As the weight of the rear end of the trailer body 60 is imposed on the outer end of the skids 24 of the turntable 22, the springs 26 (FIGURES 10 and 10B) yield to permit the outer end of the skids to tip downwardly to the point where their under surfaces rest upon the upper surface of the end platform 40 of the railroad car 20. Thus, the weight of the rear end of the trailer body is supported by the platform 40 rather than being imposed as an upsetting movement on the turntable and its rotatable support.

Figure 10A:
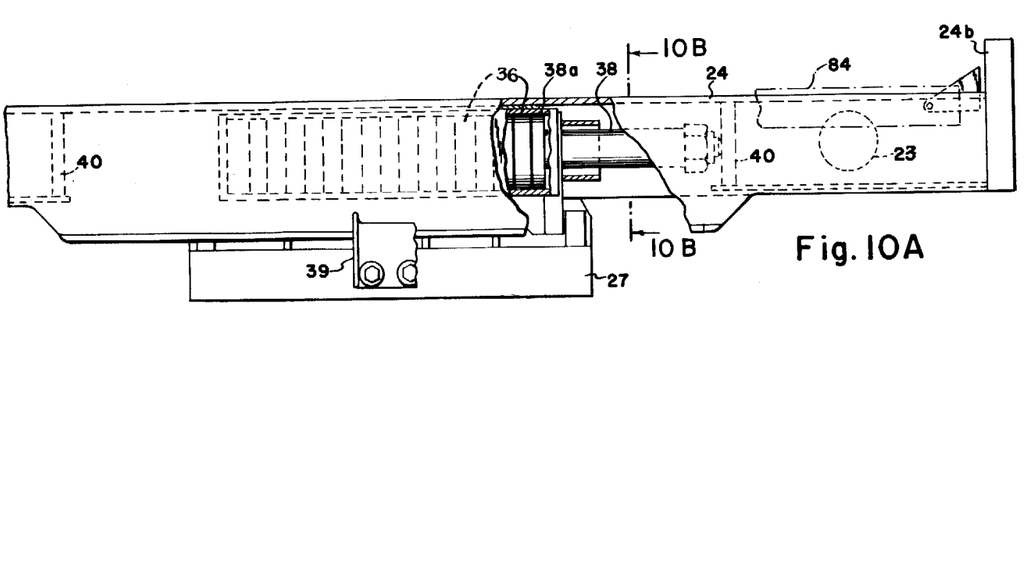
FIGURE 10A is a fragmentary side elevational view of the turntable, also shown partly broken away.

As the rear end of the trailer body rides up the ramps 24a and onto the upper portions of the skids 24, it is lifted a sufficient distance so that the rails 74 will clear the skids 76 on the bogey 78. The rearward movement of the trailer body 60 continues to the point where its rear end 60a engages stop flanges 24b (FIGURE 10A) projecting upwardly from the rear ends of the skids 24.

The tractor 90 is stopped and the fifth wheel 96 is raised to lift the front end of the trailer body 60 up level with the rear end and complete the clearance of the rails 74 on the trailer body from the skids 76 on the bogey 78. Then, as shown in FIGURE 16, the pivoting wheel 142 at the forward end of the tractor 90 is lowered and driven to swing the forward end of the tractor in a counterclockwise direction about a verticlal axis passing through the rear axle of the tractor 90 and through the kingpin on the trailer body 60 to a position at which the tractor is approximately perpendicular to the trailer body. Then, the pivoting wheel 142 is raised again and the tractor is backed up along an arc, as shown in FIGURE 17, to the point where the trailer body 60 is nearly parallel to the railroad car, with the slot 96a in the fifth wheel 96 on the tractor 90 adjacent and opposite the slot 56 in the support 50 on the railroad car 20.

As the trailer body approaches the parallel position, the inner ends of the plungers 162 (FIGURE 11A) ride into the depression 160b in the cam 160 under influence of the springs 164, allowing the levers 166 to rock in a counterclockwise direction and the locking pins 82 to be moved outwardly by the springs 170 into engagement with the holes 74a (FIGURE 3) in the rails 74 on the trailer body 60, thus automatically locking the trailer body in position on the turntable.

Figure 17:
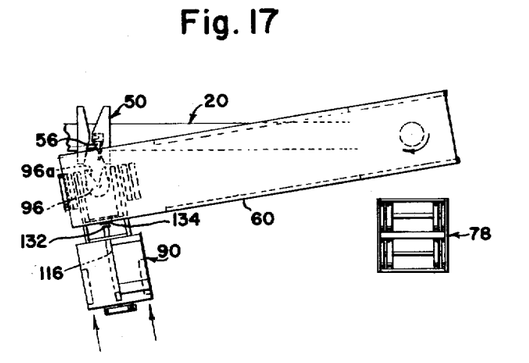
Figure 18:
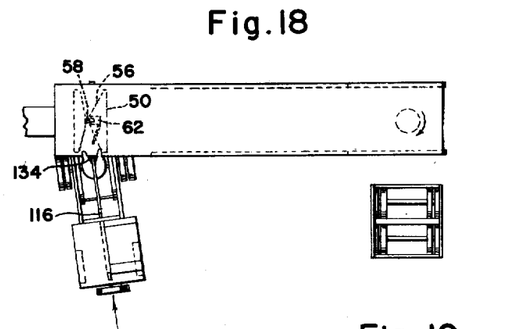
Figure 19:
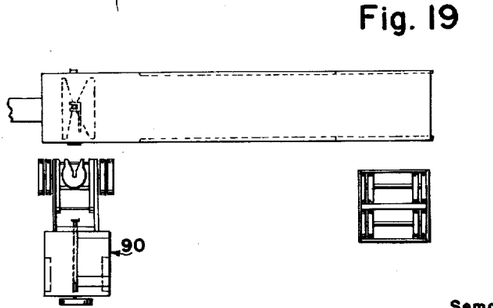

When the trailer body reaches the nearly parallel position shown in FIGURE 17, the head 132 (FIGURE 12) on the piston rod of the hydraulic cylinder 116 is then engaged in the socket 134 (FIGURE 7) on the adjacent side of the forward end of the trailer body 60 and the hydraulic cylinder 116 is used to push the forward end of the trailer body off of the fifth wheel 96 and onto the support 50 to the point where the trailer body 60 is parallel to the railroad car, as shown in FIGURE 18, and the kingpin 58 is centered in the narrow portion of the slot 56 in the support 50 on the railroad car. Then the latch 62 is moved to locking position around the kingpin 58, the piston rod of the cylinder 116 is disconnected from the socket 134, and the tractor 90 is pulled clear, as shown in FIGURE 19. The trailer body 60 is now secured on the railroad car 20 for rail transit.

To transfer the trailer body 60 from the railroad car 20 to the highway bogey 78 for highway transit, the procedure described and shown in FIGURES 14–19 is merely reversed.

As the trailer body 60 and turntable 22 are rotated to a position transverse to the car 20, the locking pins 82 (FIGURE 11) are retracted by the cam 160 (FIGURES 11 and 11a) in the manner previously described, and the trailer body is freed for movement off the turntable by the tractor 90. This makes it unnecessary for the driver to leave the cab of the tractor to unlock the trailer body from the turntable.

From the foregoing description, it will be apparent that the transfer of the trailer body between the highway bogey 78 and the rail car 20 or other carrier or stationary support may be made very quickly, with a minimum of manpower, and without extraneous equipment such as cranes, ramps and the like. It may also be observed that at all times during the transfer, as well as when the trailer body is mounted either on the bogey 78 or the rail car 20, it is supported at both ends so that it is unnecessary to maintain a balanced load in the trailer body. Moreover, the trailer body does not project beyond the "off" side of the railroad car 20 so that the transfer to or from the railroad car may be made even though the "off" side is obstructed, for example by another track on which there are other cars. It is also apparent that even where the railroad car is adapted to handle two trailer bodies, one-half of the weight of each of the trailer bodies is supported substantially directly over the wheel trucks so that the railroad car does not have to be constructed as strong as in previous systems in which the full weight of the trailer was supported on a turntable mounted at a central portion of the car a substantial distance from the wheel truck bolsters. Moreover, the railroad car requires no hydraulic jack for raising and loweing the turntable. Thus the railroad car can be made much less expensively and has a much lower tare weight.

It will therefore be appreciated that the aforementioned and other desirable advantages and objectives have been achieved. However, it should be emphasized that the particular embodiment of the invention, which is described herein and shown in the accompanying drawings, is intended as merely illustrative of the principles of the invention rather than as restrictive of the scope thereof, which is limited only by the appended claims.

We claim:

1. A freight handling system comprising a railroad car having a turntable mounted at its upper surface for rotation about a vertical axis, a pair of spaced, parallel, horizontally extending skids at the upper surface of said turntable, a support mounted at the upper surface of said railroad car at a distance from said turntable and having a kingpin receiving slot in at least one side thereof, a highway wheel assembly having at its upper surface a pair of parallel, horizontally extending skids spaced apart approximately the same distance as the skids on said turntable, a trailer body having at the front portion of its under surface a downwardly projecting kingpin and at the rear portion thereof a pair of spaced, parallel rails adapted for longitudinally slidable, laterally interlocking relation with both of said pairs of skids, interengageable means on said trailer body and each of said pairs of skids for holding said trailer body in predetermined longitudinal position on each of said pairs of skids, a tractor, a fifth wheel mounted at the upper surface at one end of said tractor and having a slot and locking means for detachable engagement with said kingpin, a power operated ram on said tractor, and separable means for interengagement of the end of said ram with said trailer body, whereby with said tractor positioned alongside said railroad car with the slot of said fifth wheel opposite the slot of said support, said ram can be interengaged with said trailer body to rotate said trailer body and said turntable to transfer said kingpin from said support to said fifth wheel, and vice versa, and with said kingpin in said fifth wheel, said tractor can rotate said trailer body between a position generally parallel to said railroad car and a position generally perpendicular thereto, and with said highway wheel assembly positioned alongside said railroad car to align the skids on said highway wheel assembly with those on said railroad car, said tractor can slide said trailer body longitudinally from one pair of said skids to the other to transfer said trailer body from said railroad car to said highway wheel assembly and vice versa.

2. A freight handling system comprising a railroad car having a turntable mounted at its upper surface for rotation about a vertical axis, a pair of spaced, parallel, horizontally extending skids at the upper surface of said turntable, a support mounted at the upper surface of said railroad car at a distance from said turntable and having a kingpin receiving slot in at least one side thereof, a highway wheel assembly having at its upper surface a pair of parallel, horizontally extending skids spaced apart approximately the same distance as the skids on said turntable, the skids on said turntable being at a slightly higher level than those on said highway wheel assembly and their outer ends having ramp portions sloping downwardly to the level of the skids on said highway wheel assembly, a trailer body having at the front portion of its under surface a downwardly projecting kingpin and at the rear portion thereof a pair of spaced, parallel rails adapted for longitudinally slidable, laterally interlocking relation with both of said pairs of skids, engageable means on said trailer body and each of said pairs of skids for holding said trailer body in predetermined longitudinal position on said skids, a tractor, a fifth wheel mounted for vertical movement at the upper surface of said tractor and having an outwardly facing slot and latching means therein for detachable engagement with said kingpin, power means for raising and lowering said fifth wheel, a power operated ram on said tractor, and separable means for interengagement of the end of said ram with said trailer body, whereby with said tractor positioned alongside said railroad car with the slot of said fifth wheel opposite the slot of said support, said ram can be interengaged with said trailer body to rotate said trailer body and said turntable to transfer said kingpin from said support to said fifth wheel and vice versa, and with said kingpin in said fifth wheel, said tractor can rotate said trailer body between a position generally parallel to said railroad car and a position generally perpendicular thereto, and with said highway wheel assembly positioned alongside said railroad car and said turntable oriented to align the skids thereon with the skids on said highway wheel assembly, said tractor can slide said trailer body longitudinally from one pair of said skids to the other to transfer said trailer body from said railroad car to said highway wheel assembly and vice versa, and whereby movement of said trailer body up said ramp portions and onto the skids on said turntable and raising of said fifth wheel lifts said trailer body sufficiently to disengage the rails thereon from the skids on said highway wheel assembly to permit rotation of said trailer body by said tractor to a position parallel with said railroad car.

3. A freight handling system comprising a railroad car having a turntable mounted at its upper surface for rotation about a vertical axis, a pair of spaced, parallel, horizontally extending skids at the upper surface of said turntable, a support mounted at the upper surface of said railroad car at a distance from said turntable and having a kingpin receiving slot in at least one side thereof, a highway wheel assembly having at its upper surface a pair of parallel, horizontally extending skids, spaced apart approximately the same distance as the skids on said turntable, a trailer body having at the front portion of its under surface a downwardly projecting kingpin and at the rear portion thereof a pair of spaced, parallel rails adapted for longitudinally slidable, laterally interlocking relation with both of said pairs of skids, engageable means on said trailer body and each of said pairs of skids for holding said trailer body in predetermined longitudinal position on said skids, a tractor, a fifth wheel mounted at the upper surface at one end of said tractor and having a slot and locking means for detachable engagement with said kingpin, a ram mounted on said tractor in a generally horizontal position for both longitudinal and transverse movement, power means for moving said ram both longitudinally and transversely, and interengageable means on the outer end of said ram and one side of said tractor in approximate transverse alignment with the position of said kingpin, said interengageable means being engaged and disengaged by transverse movement of said ram, whereby with said tractor positioned alongside said railroad car with the slot of said fifth wheel opposite the slot of said support, said ram can be interengaged with said trailer body to rotate said trailer body and said turntable to transfer said kingpin from said support to said fifth wheel and vice versa, and with said kingpin in said fifth wheel, said tractor can rotate said trailer body between a position generally parallel to said railroad car and a position generally perpendicular thereto, and with said highway wheel assembly positioned alongside said railroad car and said turntable oriented to align the skids thereon with the skids on said highway wheel assembly, said tractor can slide said trailer body longitudinally from one pair of said skids to the other to transfer said trailer body from said railroad car to said highway wheel assembly and vice versa.

4. A freight handling system comprising a railroad car having a turntable mounted at its upper surface for rotation about a vertical axis, a pair of spaced, parallel, horizontally extending skids at the upper surface of said turntable, a support mounted at the upper surface of said railroad car at a distance from said turntable and having a kingpin receiving slot in at least one side thereof, a highway wheel assembly having at its upper surface a pair of parallel, horizontally extending skids spaced apart approximately the same distance as the skids on said turntable, a trailer body having at the front portion of its under surface a downwardly projecting kingpin and at the rear portion thereof a pair of spaced, parallel rails adapted for longitudinally slidable, laterally interlocking relation with both of said pairs of skids, engageable means on said trailer body and each of said pairs of skids for holding said trailer body in predetermined longitudinal position on said skids, a tractor, a fifth wheel mounted at the upper surface at the rear end of said tractor and having a slot and locking means for detachable engagement with said kingpin, two longitudinally spaced sets of transversely spaced road wheels mounted on transverse axles on said tractor, the front set of said wheels being steerable, and a pivoting wheel mounted at the front end of said tractor, said pivoting wheel being mounted on a longitudinal axle which is supported on said tractor for vertical movement, power means for lowering said pivoting wheel to engage the ground and raise the front pair of road wheels off the ground, and power means for driving said pivoting wheel to cause said tractor to rotate in an arc about its rear end, a power operated ram on said tractor, and separable means for interengagement of the end of said ram with said trailer body, whereby with said tractor positioned alongside said railroad car with the slot of said fifth wheel opposite the slot of said support, said ram can be interengaged with said trailer body to rotate said trailer body and said turntable to transfer said kingpin from said support to said fifth wheel and vice versa, and with sid kingpin in said fifth wheel, said tractor can rotate said trailer body between a position generally parallel to said railroad car and a position generally perpendicular thereto, and with said highway wheel assembly positioned alongside said railroad car and said turntable oriented to align the skids thereon with the skids on said highway wheel assembly, said tractor can slide said trailer body longitudinally from one pair of said skids to the other to transfer said trailer body from said railroad car to said highway wheel assembly and vice versa, and whereby by lowering and driving said pivoting wheel, said tractor can rotate between a position parallel to said trailer only for pushing and pulling said trailer body longitudinally and a position perpendicular to said trailer body for rotation of said trailer body on said turntable.

5. A freight handling system comprising a railroad car having a turntable mounted at its upper surface for rotation about a vertical axis, a pair of spaced, parallel, horizontally extending skids at the upper surface of said turntable, a support mounted at the upper surface of said railroad car at a distance from said turntable and having a kingpin receiving slot in at least one side thereof, a highway wheel assembly having at its upper surface a pair of parallel, horizontally extending skids spaced apart approximately the same distance as the skids on said turntable, the skids on said turntable being at a slightly higher level than those on said highway wheel assembly and their outer ends having ramp portions sloping downwardly to the level of the skids on said highway wheel assembly, a trailer body having at the front portion of its under surface a downwardly projecting kingpin and at the rear portion thereof a pair of spaced, parallel rails adapted for longitudinally slidable, laterally interlocking relation with both of said pairs of skids, engageable means on said trailer body and each of said pairs of skids for holding said trailer body in predetermined longitudinal position on said skids, a tractor, a fifth wheel mounted for vertical movement at the upper surface of said trailer body to rotate said trailer body and latching means therein for detachable engagement with said kingpin, power means for raising and lowering said fifth wheel, a ram mounted on said tractor in a generally horizontal position for both longitudinal and transverse movement, power means for moving said ram both longitudinally and transversely, and interengageable means on the outer end of said ram and one side of said tractor in approximate transverse alignment with the position of said kingpin, said interengageable means being engaged and disengaged by transverse movement of said ram, whereby with said tractor positioned alongside said railroad car with the slot of said fifth wheel opposite the slot of said support, said ram can be interengaged with said trailer body to rotate said trailer body and said turntable to transfer said kingpin from said support to said fifth wheel and vice versa, and with said kingpin in said fifth wheel, said tractor can rotate said trailer body between a position generally parallel to said railroad car and a position generally perpendicular thereto, and with said highway wheel assembly positioned alongside said railroad car and said turntable oriented to align the skids thereon with the skids on said highway wheel assembly, said tractor can slide said trailer body longitudinally from one pair of said skids to the other to transfer said trailer body from said railroad car to said highway wheel assembly and vice versa, and whereby movement of said trailer body up said ramp portions and onto the skids on said turntable and raising of said fifth wheel lifts said trailer body sufficiently to disengage the rails thereon from the skids on said highway wheel assembly to permit rotation of said trailer body by said tractor to a position parallel with said railroad car.

6. A freight handling system comprising a railroad car having a turntable mounted at its upper surface for rotation about a vertical axis, a pair of spaced, parallel, horizontally extending skids at the upper surface of said turntable, a support mounted at the upper surface of said railroad car at a distance from said turntable and having a kingpin receiving slot in at least one side thereof, a highway wheel assembly having at its upper surface a pair of parallel, horizontally extending skids spaced apart approximately the same distance as the skids on said turntable, the skids on said turntable being at a slightly higher level than those on said highway wheel assembly and their outer ends having ramp portions sloping downwardly to the level of the skids on said highway wheel assembly, a trailer body having at the front portion of its under surface a downwardly porjecting kingpin and at the rear portion thereof a pair of spaced, parallel rails adapted for longitudinally slidable, laterally interlocking relation with both of said pairs of skids, engageable means on said trailer body and each of said pairs of skids for holding said trailer body in predetermined longitudinal position on said skids, a tractor, a fifth wheel mounted for vertical movement at the upper surface of the rear end of said tractor and having an outwardly facing slot and latching means therein for detachable engagement with said kingpin, two longitudinally spaced pairs of transversely spaced road wheels mounted on transverse axles on said tractor, one pair of said wheels being steerable, and a pivoting wheel mounted at the front end of said tractor, said pivoting wheel being mounted in a longitudinal axle which is supported on said tractor for vertical movement, power means for lowering said pivoting wheel to engage the ground and raise the front pair of road wheels off the ground, and power means for driving said pivoting wheel to cause said tractor to rotate in an arc about its rear end, a power operated ram on said tractor, and separable means for interengagement of the end of said ram with said trailer body, whereby with said tractor positioned alongside said railroad car with the slot of said fifth wheel opposite the slot of said support, said ram can be interengaged with said trailer body to rotate said trailer body and said turntable to transfer said kingpin from said support to said fifth wheel and vice versa, and with said kingpin in said fifth wheel, said tractor can rotate said trailer body between a position generally parallel to said railroad car and a position generally perpendicular thereto, and with said highway wheel assembly positioned alongside said railroad car and said turntable oriented to align the skids thereon with the skids on said highway wheel assembly, said tractor can slide said trailer body longitudinally from one pair of said skids to the other to transfer said trailer body from said railroad car to said highway wheel assembly and vice versa, and whereby movement of said trailer body up said ramp portions and onto the skids on said turntable and raising of said fifth wheel lifts said trailer body sufficiently to disengage the rails thereon from the skids on said highway wheel assembly to permit rotation of said trailer body by said tractor to a position parallel with said railroad car, and whereby by lowering and driving said pivoting wheel, said tractor can rotate between a position parallel to said trailer body for pushing and pulling said trailer body longitudinally and a position perpendicular to said trailer body for rotation of said trailer body on said turntable.

7. A freight handling system comprising a railroad car having a turntable mounted at its upper surface for rotation about a vertical axis, a pair of spaced, parallel, horizontally extending skids at the upper surface of said turntable, a support mounted at the upper surface of said railroad car at a distance from said turntable and having a kingpin receiving slot in at least one side thereof, a highway wheel assembly having at its upper surface a pair of parallel, horizontally extending skids spaced apart approximately the same distance as the skids on said turntable, a trailer body having at the front portion of its under surface a downwardly projecting kingpin and at the rear portion thereof a pair of spaced, parallel rails adapted for longitudinally slidable, laterally interlocking relation with both of said pairs of skids, engageable means on said trailer body and each of said pairs of skids for holding said trailer body in predetermined longitudinal position on said skids, a tractor, a fifth wheel mounted at the upper surface at one end of said tractor and having a slot and locking means for detachable engagement with said kingpin, two longitudinally spaced pairs of transversely spaced road wheels mounted on transverse axles on said tractor, one pair of said wheels being steerable, and a pivoting wheel mounted at the front end of said tractor, said pivoting wheel being mounted on a longitudinal axle which is supported on said tractor for vertical movement, power means for lowering said pivoting wheel to engage the ground and raise the front pair of road wheels off the ground, and power means for driving said pivoting wheel to cause said tractor to rotate in an arc about its rear end, a ram mounted on said tractor in a generally horizontal position for both longitudinal and transverse movement, power means for moving said ram both longitudinally and transversely, and interengageable means on the outer end of said ram and one side of said tractor in approximate transverse alignment with the position of said kingpin, said interengageable means being engaged and disengaged by transverse movement of said ram, whereby with said tractor positioned alongside said railroad car with the slot of said fifth wheel opposite the slot of said support, said ram can be interengaged with said trailer body to rotate said trailer body and said turntable to transfer said kingpin from said support to said fifth wheel and vice versa, and with said kingping in said fifth wheel, said tractor can rotate said trailer body between a position generally parallel to said railroad car and a position generally perpendicular thereto, and with said highway wheel assembly positioned alongside said railroad car and said turntable oriented to align the skids thereon with the skids on said highway wheel assembly, said tractor can slide said trailer body longitudinally from one pair of said skids to the other to transfer said trailer body from said railroad car to said highway wheel assembly and vice versa, and whereby by lowering and driving said pivoting wheel, said tractor can rotate between a position parallel to said trailer body for pushing and pulling said trailer body longitudinally and a position perpendicular to said trailer body for rotation of said trailer body on said turntable.

8. A freight handling system comprising a railroad car having a turntable mounted at its upper surface for rotation about a vertical axis, a pair of spaced, parallel, horizontally extending skids at the upper surface of said turntable, a support mounted at the upper surface of said railroad car at a distance from said turntable and having a kingpin receiving slot in at least one side thereof, a highway wheel assembly having at its upper surface a pair of parallel, horizontally extending skids spaced apart approximately the same distance as the skids on said turntable, the skids on said turntable being at a slightly higher level than those on said highway wheel assembly and their outer ends having ramp portions sloping downwardly to the level of the skids on said highway wheel assembly, a trailer body having at the front portion of its under surface a downwardly projecting kingpin and at the rear portion thereof a pair of spaced, parallel rails adapted for longitudinally slidable, laterally interlocking relation with both of said pairs of skids, engageable means on said trailer body and each of said pairs of skids for holding said trailer body in predetermined longitudinal position on said skids, a tractor, a fifth wheel mounted for vertical movement at the upper surface of said tractor and having an outwardly facing slot and latching means therein for detachable engagement with said kingpin, power means for raising and lowering said fifth wheel, two longitudinally spaced pairs of transversely spaced road wheels mounted on transverse axles on said tractor, the front pair of said wheels being steerable, and a pivoting wheel mounted at the front end of said tractor, said pivoting wheel being rotatably mounted on a longitudinally extending axle which is supported on said tractor for vertical movement, power means for lowering said pivoting wheel to engage the ground and raise the front pair of road wheels off the ground, and power means for driving said pivoting wheel to cause said tractor to rotate in an arc about said fifth wheel, a ram mounted on said tractor in a generally horizontal position for both longitudinal and transverse movement, power means for moving said ram both longitudinally and transversely, and interengageable means on the outer end of said ram and one side of said tractor in approximate transverse alignment with the position of said kingpin, said interengageable means being engaged and disengaged by transverse movement of said ram, whereby with said tractor positioned alongside said railroad car with the slot of said fifth wheel opposite the slot of said support, said ram can be interengaged with said trailer body to rotate said trailer body and said turntable to transfer said kingpin from said support to said fifth wheel and vice versa, and with said kingpin in said fifth wheel, said tractor can rotate said trailer body between a position generally parallel to said railroad car and a position generally perpendicular thereto, and with said highway wheel assembly positioned alongside said railroad car and said turntable oriented to align the skids thereon with the skids on said highway wheel assembly, said tractor can slide said trailer body longitudinally from one pair of said skids to the other to transfer said trailer body from said railroad car to said highway wheel assembly and vice versa, and whereby movement of said trailer body up said ramp portions and onto the skids on said turntable and raising of said fifth wheel lifts said trailer body sufficiently to disengage the rails thereon from the skids on said highway wheel assembly to permit rotation of said trailer body by said tractor to a position parallel with said railroad car, and whereby by lowering and driving said pivoting wheel, said tractor can rotate between a position parallel to said trailer body for pushing and pulling said trailer body longitudinally and a position perpendicular to said trailer body for rotation of said trailer body on said turntable.

9. A freight handling system comprising a railroad car having a turntable mounted at its upper surface for rotation about a vertical axis, a pair of spaced, parallel horizontally extending skids at the upper surface of said turntable, a support mounted at the upper surface of said railroad car at a distance from said turntable and having a kingpin receiving slot in at least one side thereof, a highway wheel assembly having at its upper surface a pair of parallel, horizontally extending skids spaced apart approximately the same distance as the skids on said turntable, a trailer body having at the front portion of its under surface a downwardly projecting kingpin and at the rear portion thereof a pair of spaced, parallel rails adapted for longitudinally slidable, laterally interlocking relation with both of said pairs of skids, holes in the rails on said trailer body and locking pins movably mounted on each of said pairs of skids for holding said trailer body in predetermined longitudinal position on each of said pairs of skids, cam means on said railroad car linked to the locking pin in the skids of said turntable to retract said locking pin from position to engage said holes when said turntable is rotated away from a position at which said skids are aligned with the long axis of said railroad car, a tractor, a fifth wheel mounted at the upper surface at one end of said tractor and having a slot and locking means for detachable engagement with said kingpin, a power operated ram on said tractor, and separable means for interengagement of the end of said ram with said trailer body, whereby with said tractor positioned alongside said railroad car with the slot of said fifth wheel opposite the slot of said support, said ram can be interengaged with said trailer body to rotate said trailer body and said turntable to transfer said kingpin from said support to said fifth wheel and vice versa, and with said kingpin in said fifth wheel, said tractor can rotate said trailer body between a position generally parallel to said railroad car and a position generally perpendicular thereto, and with said highway wheel assembly positioned alongside said railroad car to align the skids on said highway wheel assembly with those on said railroad car, said tractor can slide said trailer body longitudinally from one pair of said skids to the other to transfer said trailer body from said railroad car to said highway wheel assembly and vice versa.

10. In a freight handling system, the combination comprising a freight carrying body, a wheeled frame for removably coupling to and supporting the rear end of said body, a tractor, means on said tractor for rotatably supporting and removably coupling to the forward portion of said body, a railroad car, means on said railroad car to rotatably support the rear end of said body while said tractor remains coupled thereto and said wheeled frame is uncoupled therefrom, means for rotation of said tractor about its axis of coupling to said body while said body remains stationary whereby said tractor may be placed in a position to effect rotation of said body about the axis of rotation of said means on said railroad car supporting said rear end of said body, said body being movable by said tractor to a position longitudinally adjacent the side of said railroad car, a power operated ram operatively connected to said tractor and separable means for inter-engagement of the free end of said ram and said forward portion of said body to push said forward portion onto said railroad car until the longitudinal axis of said body assumes a position of substantial parallelism with the longitudinal axis of said railroad car, means on said railroad car to support the forward portion of said body after said body has been transferred to said railroad car from said tractor, and means operative between said body and said railroad car to releasably maintain said body on said railroad car substantially in its mounted position, said power operated ram also being capable of releasably moving the forward portion of said body off said railroad car and onto said tractor.

11. The combination of claim 10 wherein said ram is mounted on said tractor in a generally horizontal position for both longitudinal and vertical movement and power means for moving said ram to effect separable inter-engagement of the free end of said ram and said forward portion of said body.

12. The combination of claim 11 wherein said ram and body inter-engaging means includes an enlarged head at the free end of said ram and an open-ended socket member on said forward portion of said body, said head being adapted to enter said socket through the open end thereof by vertical movement of said ram, said ram being thereafter disengageable from said socket member upon vertical movement only of said ram.

13. The combination of claim 10 wherein said tractor includes two longitudinally spaced sets of transversely spaced road wheels, the front set being steerable, and said means for rotation of said tractor about its axis of coupling to said body while said body remains stationary includes a pivoting wheel mounted for vertical movement at the front end of said tractor, means for lowering said pivoting wheel to engage the ground and raise the front pair of road wheels off the ground and means for driving said pivoting wheel to cause said tractor to rotate in an arc about the axis of its coupling to said body.

14. The combination of claim 10 wherein said means operative between said body and said railroad car to releasably maintain said body on said railroad car substantially in its mounted position is resiliently connected to said railroad car for limited longitudinal sliding movement thereof whereby impact forces on said body and its contents are minimized.

15. The combination of claim 10 wherein said means operative between said body and said railroad car to releasably maintain said body on said railroad car substantially in its mounted position is resiliently connected to said railroad car for limited vertical movement relative to said railroad car whereby vertical and transverse impact forces on said body and its contents are minimized.

16. In a freight handling system, a freight carrying body, a highway wheel assembly, means for removably coupling said wheel assembly to one end portion of said body, means on said body for removably supporting said one end portion upon a railroad car when said wheel assembly has been uncoupled from said body, and a socket member on said body adjacent to its other end including a flaring opening narrowing to a slot which is closed at its end opposite said opening adapted for removable coupling through said flaring opening and slot to a ram to push or pull said other end portion of said body about an axis of rotation through said one end portion when said wheel assembly has been uncoupled therefrom and said one end portion is supported upon a railroad car.

17. The combination of claim 16 wherein such socket members are provided on both sides of said body adjacent to said other end thereof, and said wheel assembly coupling means includes said means for removably supporting said one end portion upon a railroad car.

18. In a freight handling system, a freight carrying body, a highway wheel assembly, means for removably coupling said wheel assembly to one end portion of said body, means on said body for removably supporting said one end portion upon a railroad car when said wheel assembly has been uncoupled from said body, and a socket member on the side of said body adjacent to its other end including an upwardly flaring opening narrowing to an upwardly opening slot closed at its bottom and adapted for removable coupling through said flaring opening and slot to a ram to push or pull said other end of said body about an axis of rotation through said one end portion of said body when said wheel assembly has been uncoupled therefrom and said one end portion is supported upon a railroad car.

19. In a freight handling system, a highway wheel assembly having at its upper surface a pair of parallel, horizontally extending skids, a trailer body having at the rear portion thereof a pair of spaced, parallel rails adapted for longitudinally slidable, laterally interlocking relation with said skids, said rails being adapted for removably engaging a railroad car to support said rear portion of said body thereon, and a socket member and mounted on the forward portion of said body, said socket member including a flaring opening narrowing to a slot which is closed at its end opposite said opening being adapted for removable coupling through said flaring opening and slot to a ram to push or pull said forward portion of said body about an axis of rotation at its rear portion when the latter is supported upon a railroad car.

20. In a freight handling system, a highway wheel assembly having at its upper surface a pair of parallel, horizontally extending skids, a trailer body having at the rear portion thereof a pair of spaced, parallel rails adapted for longitudinally slidable, laterally interlocking relation with said skids, said rails being adapted for removably engaging a railroad car to support said rear portion of said body thereon, and a socket member mounted on the side of the forward portion of said body, said socket member including an upwardly flaring opening narrowing down to an upwardly opening slot closed at its bottom and adapted for removable coupling through said flaring opening and slot to a ram to push or pull said forward portion of said body about an axis of rotation at its rear portion when the latter is supported upon a railroad car.

21. In a freight handling system, a freight carrying body, a highway wheel assembly, means for removably coupling said wheel assembly to one end portion of said body, means on said body for removably supporting said one end portion upon a railroad car when said wheel assembly has been uncoupled from said body and a socket member on the side of said body adjacent to its other end, said socket member including a slotted wall, the slot formed by said slotted wall being open at one end and closed at the other, said slot permitting communication between the interior of the socket and the exterior of the wall, said socket member being adapted for removable coupling through said open end and said slot to a ram to push and pull said other end of said body about an axis of rotation through said one end portion of said body when said wheel assembly has been uncoupled therefrom and said one end portion is supported upon a railroad car.

References Cited in the file of this patent

UNITED STATES PATENTS

| 1,968,196 | Francis | July 31, 1934 |
| 2,108,813 | Fitch | Feb. 22, 1938 |
| 2,693,889 | Fellabaum | Nov. 9, 1954 |
| 2,933,052 | Mellam | Apr. 19, 1960 |
| 3,002,636 | Felburn | Oct. 3, 1961 |

UNITED STATES PATENT OFFICE
CERTIFICATE OF CORRECTION

Patent No. 3,112,040          November 26, 1963

Semond Levitt et al.

It is hereby certified that error appears in the above numbered patent requiring correction and that the said Letters Patent should read as corrected below.

Column 10, line 11, for "sid" read -- said --; line 49, for "trailer body to rotate said trailer body" read -- tractor and having an outwardly facing slot --; column 11, line 22, for "porjecting" read -- projecting --.

Signed and sealed this 16th day of June 1964.

(SEAL)
Attest:

ERNEST W. SWIDER          EDWARD J. BRENNER
Attesting Officer           Commissioner of Patents